United States Patent

Malvar et al.

[11] Patent Number: 5,805,739
[45] Date of Patent: Sep. 8, 1998

[54] LAPPED ORTHOGONAL VECTOR QUANTIZATION

[75] Inventors: Henrique S. Malvar, Andover; Gary J. Sullivan, Arlington; Gregory W. Wornell, Wellesley, all of Mass.

[73] Assignee: PictureTel Corporation, Andover, Mass.

[21] Appl. No.: 631,644

[22] Filed: Apr. 2, 1996

[51] Int. Cl.[6] .............................. G06K 9/36; G06K 9/38
[52] U.S. Cl. ............................................. 382/253; 382/248
[58] Field of Search .................................... 382/253, 248, 382/205, 225; 348/414, 417, 418, 422; 395/2.31; 358/433

[56] References Cited

U.S. PATENT DOCUMENTS 5,455,874 10/1995 Ormsby et al. ......................... 382/251

*Primary Examiner*—Phuoc Tran
*Attorney, Agent, or Firm*—Fish & Richardson P.C.

[57] ABSTRACT

A method and apparatus for encoding a sampled signal using a nonscalar vector quantizer. A lapping window operator is applied to blocks of signal samples of length greater than N to produce length-N transform vectors which are then encoded by a nonscalar vector quantizer. The method and apparatus may use or have a window operator that is identical to that of the modulated lapped transform, that is a 2N×N matrix operator, that is identical to that of the modulated lapped transform with asymmetrical, orthogonal butterflies, or that has butterfly transmittances given by $h[n]=\sin[(2n+1)\pi/4N]$. The method and apparatus may use or have a vector quantizer is an unconstrained mean-square optimized vector quantizer having codewords of length N. The method and apparatus may use or have a vector reconstructor being an inverse of the nonscalar vector quantizer to reconstruct length-N vectors coupled through a transmission channel to received the length-N vectors from the vector quantizer, and a block decoder connected to receive as input the reconstructed length-N vectors from the vector reconstructor and to apply a reconstructor window operator to produce vectors that may be superimposed to generate a reconstruction of the sampled signal. The reconstructor window operator may be the inverse of the lapping window operator.

10 Claims, 6 Drawing Sheets

LAPPED ORTHOGONAL VECTOR QUANTIZATION

BACKGROUND OF THE INVENTION

The invention relates generally to multi-dimensional signal processing methods and apparatus, and in particular to methods and apparatus useful for processing multi-dimensional signals, such as two-dimensional pictorial images.

Vector quantization (VQ) plays an important role in a wide range of signal coding and data compression applications. In a typical application of VQ, involving imagery or speech for example, the signal is partitioned into contiguous blocks of equal size, each of which corresponds to a vector of signal samples. Each vector of signal samples is then encoded by one of a set of candidate codevectors that is closest to the vector with respect to some distortion measure. This set of candidate codevectors—the codebook—is available to the decoder as well, so for each block only the index of the codevector need be transmitted to allow suitable reconstruction of the block at the receiver.

VQ systems are generally memory-intensive, but the memory requirements are symmetric with respect to the encoder and decoder. The codebook size is $O(2^{RN})$, where R is the prescribed bit rate (bits per sample) and N is the block size (number of samples per block). Consequently, codebook memory requirements grow dramatically with block size.

By contrast, the computational requirements of VQ systems are highly asymmetric. A full codebook search at the encoder has a computational complexity comparable to the memory requirements, namely $O(2^{RN})$ per vector. Decoding complexity is negligible, however, since it requires no more than a simple table lookup. This asymmetry is well-suited to a variety of applications, such as database browsing. However, VQ systems and subsystems are also widely used in a wide spectrum of other applications, including video-conferencing and digital audio systems.

It is well known that VQ is an asymptotically optimal compression strategy: Given a sufficiently long block length and suitably designed codebook, the rate-distortion bound for the source can be approached arbitrarily closely. However, memory and computational requirements strongly limit block lengths, and as a result the asymptotic limits are rarely approached in practice. The use of constrained or structured codebooks can reduce the computational and/or memory requirements, allowing larger block sizes to be used. However, with such constraints, VQ is generally not asymptotically optimal.

An important class of coding systems that can be interpreted as a form of VQ with constrained codebooks is the traditional approach of using a linear block transform followed by scalar quantization. As is well known, the resulting system is equivalent to a VQ system in which the codebook corresponds to a rotated Cartesian lattice of codevectors. The memory requirements of such systems are $O(N2^R)$, dramatically lower than the requirements for a full-search unconstrained vector quantizer. Moreover, if a fast-computable transform is used, the computational complexity at both the encoder and decoder is only $O(\log N)$ per sample. However, although reasonable performance can often be achieved by means of transform coding, the performance of transform coding does not approach the rate-distortion bound with increasing block size.

The need to use finite block sizes in constrained and unconstrained VQ systems not only limits how closely the rate-distortion bound can be approached, but also leads to unnatural and perceptually distracting blocking artifacts. Mean-square coding distortion is not minimized because interblock dependencies are not exploited, and blocking artifacts arise because the distortion that is introduced by the coding process has statistics that are periodic with a period equal to the block size.

One class of techniques for mitigating artifacts in block processing systems such as VQ involves applying a temporally- or spatially-varying filter to the reconstructed signal at the decoder. Such techniques can be combined with suitable prefiltering to reduce blocking artifacts, but at the expense of an increase in the overall mean-square reconstruction error. See, e.g., U.S. Pat. No. 4,754,492 to Malvar for "Method and System for Adapting a Digitized Signal Processing System for Block Processing with Minimal Blocking Artifacts"; and H. S. Malvar, "The LOT: Transform Coding Without Blocking Effects", *IEEE Trans. Acoust., Speech, Signal Processing*, vol. 37, pp. 553–559, Apr. 1989. The disclosures of these publications are incorporated herein by this reference.

More efficient and effective systems have generally resulted from the use of lapped block processing strategies. For example, in unconstrained (full-search) VQ systems, blocking artifacts can be reduced by extending the reconstruction codevectors beyond the block boundaries at the decoder. A mean-square optimized overlapping reconstruction codebook can lead to a noticeable reduction of blocking artifacts and a reduction of the reconstruction error. However, a disadvantage of this particular approach is the increase in decoding complexity and memory requirements due to the increased decoder codebook size.

With lapped transforms, the input signal is represented as a linear combination of overlapping basis functions. Although other sizes are also used, often the basis functions from adjacent blocks overlap by 50% on each side of the block, so that their length is twice the block size. With such schemes, the transform matrix has size 2N×N, mapping a block of 2N input samples into a block of N transform coefficients. When the transform basis functions satisfy the additional "orthogonality in the tails" constraint so that the collection of basis functions for all blocks constitute a complete orthonormal set (see, e.g., H. S. Malvar, *Signal Processing With Lapped Transforms* Artech House, 1992), then, in the absence of quantization, perfect reconstruction of the signal can be achieved by superimposing the overlapped blocks at the decoder. Such a system will be referred to as a lapped orthogonal transform (LOT) system.

SUMMARY OF THE INVENTION

The blocking artifacts that arise in the use of traditional vector quantization schemes can, in general, be virtually eliminated by use of a new and efficient lapped VQ strategy that the inventors have named lapped orthogonal vector quantization (LOVQ). As with lapped VQ, blocks are obtained from the source in an overlapped manner, and reconstructed by the superposition of overlapped codevectors.

In general, in one aspect, the invention provides a method for encoding a sampled signal having the steps of applying a lapping window operator to blocks of signal samples of length greater than N to produce length-N transform vectors and then applying a nonscalar vector quantizer to encode the length-N transform vectors.

Embodiments of the invention may include the following features. The window operator is identical to that of the modulated lapped transform. The window operator is a 2N×N matrix operator. The window operator is a 2N×N window operator identical to that of the modulated lapped transform with asymmetrical, orthogonal butterflies. The window operator is a modulated lapped transform window operator with asymmetrical, orthogonal butterflies, and the butterfly transmittances of the window operator are given by $h[n]=\sin[(2n+1)\pi/4N]$. The vector quantizer is an unconstrained mean-square optimized vector quantizer having codewords of length N.

In general, in another aspect, the invention provides a system for transmitting a sampled signal over a transmission channel, the system having a block encoder to receive the sampled signal and apply a lapping window operator to transform overlapping length-M vectors of signal samples into non-overlapping length-N vectors, where M is greater than N; a nonscalar vector quantizer connected to receive as input the length-N vectors from the block encoder; a vector reconstructor being an inverse of the nonscalar vector quantizer to reconstruct length-N vectors coupled through the transmission channel to received the length-N vectors from the vector quantizer; and a block decoder connected to receive as input the reconstructed length-N vectors from the vector reconstructor and apply a reconstructor window operator to produce length-M vectors that may be superimposed to generate a reconstruction of the sampled signal. The reconstructor window operator may be the inverse of the lapping window operator.

The invention has a number of advantages. For example, the use of LOVQ produces substantial performance enhancements without requiring any increase in the coder or decoder codebook sizes. The use of LOVQ achieves a significant reduction in blocking artifacts, and also simultaneously a reduction in mean-square reconstruction error over nonlapped transform coding. LOVQ requires no increase in bit rate and no significant increase in computational complexity or memory requirements. The use of LOVQ leads to a modest increase in coding gain over traditional VQ schemes of comparable complexity.

For a fuller understanding of the nature and further advantages of the invention, reference should be made to the detailed description taken in conjunction with the accompanying drawings.

BRIEF DESCRIPTION OF THE DRAWINGS

The accompanying drawings, which are incorporated in, and constitute a part of, the specification, schematically illustrate specific embodiments of the invention and, together with the general description given above and the detailed description of the embodiments given below, serve to explain the principles of the invention.

FIG. 3a for traditional VQ; FIG. 3b for MLT-based LOVQ.

DETAILED DESCRIPTION

Figure 1A:
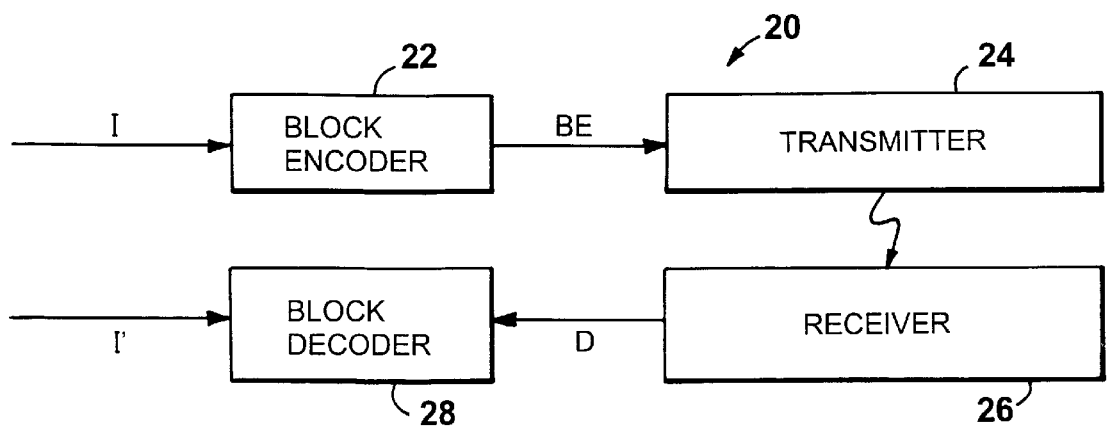
FIG. 1a is a block diagram of a system of the present invention.

Referring to FIG. 1a, a signal coding and transmission system 20 has a block encoder 22, which in operation processes an input signal I to generate a block-encoded signal BE. Transmitter 24 encodes the signal BE into a form suitable for transmission and then transmits the encoded signal over a communications medium (indicated by arrow 25) to a receiver 26, which provides a decoded signal D to a block decoder 28. Block decoder 28 transforms signal D to an output signal I', which is desired to be an image of input signal I. By way of example, input signal I may be a one- or two-dimensional signal representing, for example, speech or imagery.

The signal I presented to the block encoder 22 is signal of digital samples, which may derive directly from a digital device, such as a digital CCD camera, or from an analog-to-digital conversion of an analog signal. The block encoder 22 and the block decoder 28 may each be readily implemented as a dedicated programmable processor, such as a microprocessor, programmed (in embedded or external random access memory or read-only memory) in accordance with the disclosure set forth below. The processor for a particular application would be selected by balancing conventional commercial and engineering considerations. To achieve fast execution, the core modules of the processor program would be hand coded in a processor assembly-level language rather than in a higher-level language. However, the block encoder 22 and the block decoder 28 may be implemented in other ways, such as by a more powerful processor programmed to perform the block encoder or decoder functions in addition to other functions, by an application specific integrated circuit (ASIC), or by multiple processors each programmed to perform one stage of the encoding or decoding processes.

Figure 1B:
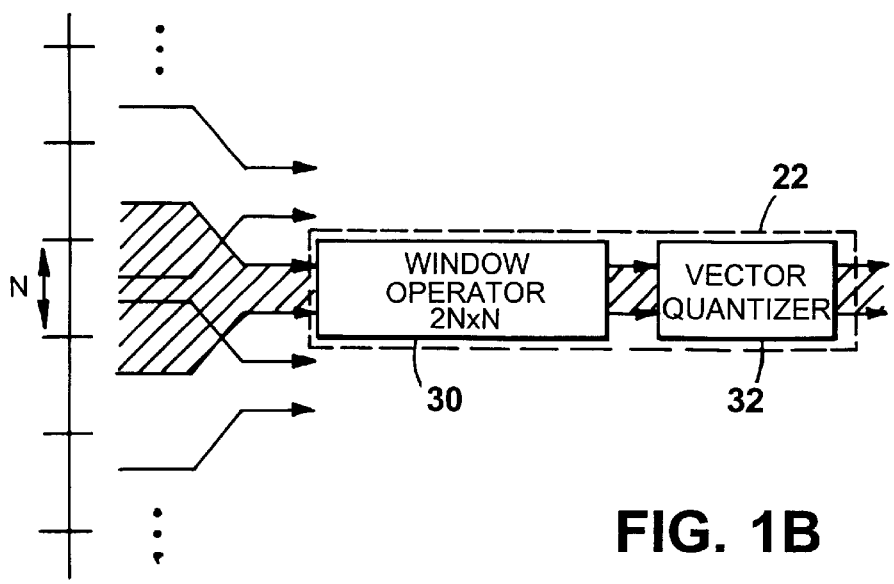
FIG. 1b is a block diagram illustrating a block encoder in accordance with the invention.
Figure 1C:
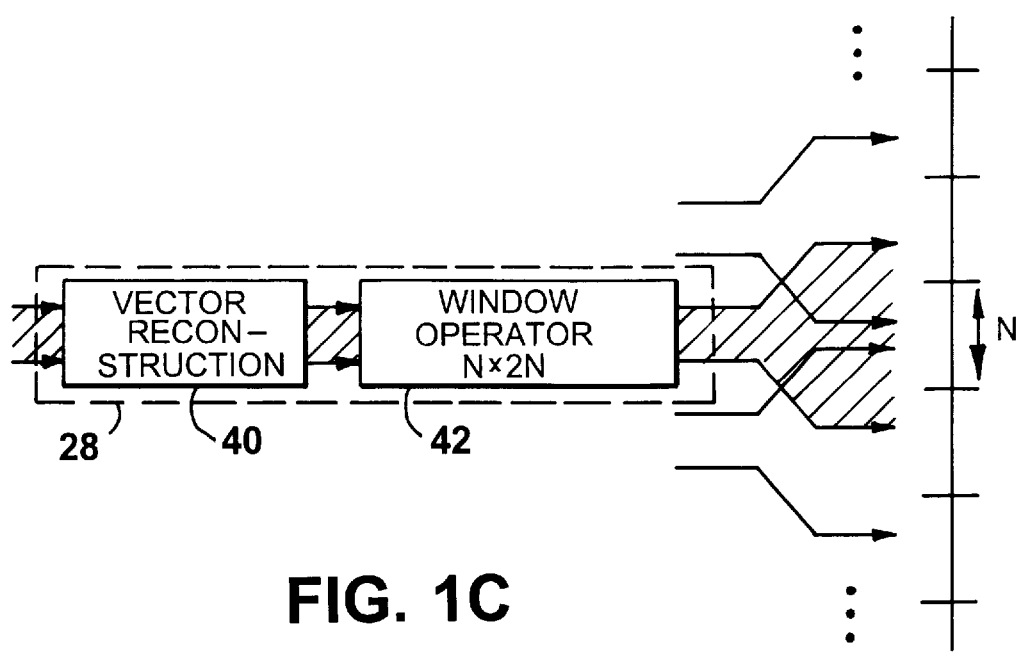
FIG. 1c is a block diagram illustrating a block decoder in accordance with the invention.

Referring to FIG. 1b, the LOVQ block encoder 22 is composed of a window operator 30 followed by a nonscalar vector quantizer 32. Referring to FIG. 1c, the corresponding decoder structure 28 is composed of a VQ decoder (reconstructor) 40 followed by an inverse (reconstructor) window operator 42. This LOVQ encoding structure provides a level of performance previously available only from a full LOT operator followed by a vector quantizer. A key insight of the present invention is that the full LOT operator, which is typically implemented as a window operator followed by an orthogonal transform operator, can be replaced by just a window operator, as long as it is combined with an appropriately designed vector quantizer. This is true because vector quantization performance is virtually unchanged by an orthogonal rotation of its input vector. For the same reason, the block decoder 28 of FIG. 1c can use just a window operator in place of a full inverse LOT operator.

In one embodiment, the vector quantizer 32 is an unconstrained mean-square optimized vector quantizer having codewords of length N. In alternative embodiments, the vector quantizer 32 may be any form of vector quantizer, such as a lattice quantizer, a trellis quantizer, or a full-search quantizer, other than a quantizer that is, or that is representable as, a scalar quantizer or a scalar quantizer preceded by an orthogonal transform, which excluded quantizers will be referred to collectively as "scalar quantizers".

While vector quantizers would operate with a full LOT operator, producing a VQ-LOT transform coding system, it is the inventors' discovery and invention that the same performance can be achieved by combining a traditional vector quantizer with just the window operators 30 and 42. This leads to a dramatic reduction in decoding complexity, from O(N log N) per output vector for a VQ-LOT system to O(N) per output vector for a LOVQ system.

The VQ decoder 40 need be no more than a simple table lookup operator where the appropriate length-N codevector is selected according to the received index. The window operator inverse 42, in turn, maps successive length-N codevectors into overlapping length-2N codevectors that are superimposed to generate the reconstruction at the output.

The choice of window operator 30 has a significant impact on the performance of the resulting system, both in terms of mitigating blocking artifacts and reducing mean-square coding distortion. The structure of this operator also affects the additional computational complexity inherent in the use of LOVQ over traditional VQ systems. From these perspectives, a particularly attractive choice for the input window operator 30 is that corresponding to the class of LOT systems referred to as modulated lapped transform (MLT) systems. See, e.g., H. S. Malvar, *Signal Processing With Lapped Transforms*, supra.

Figure 2:
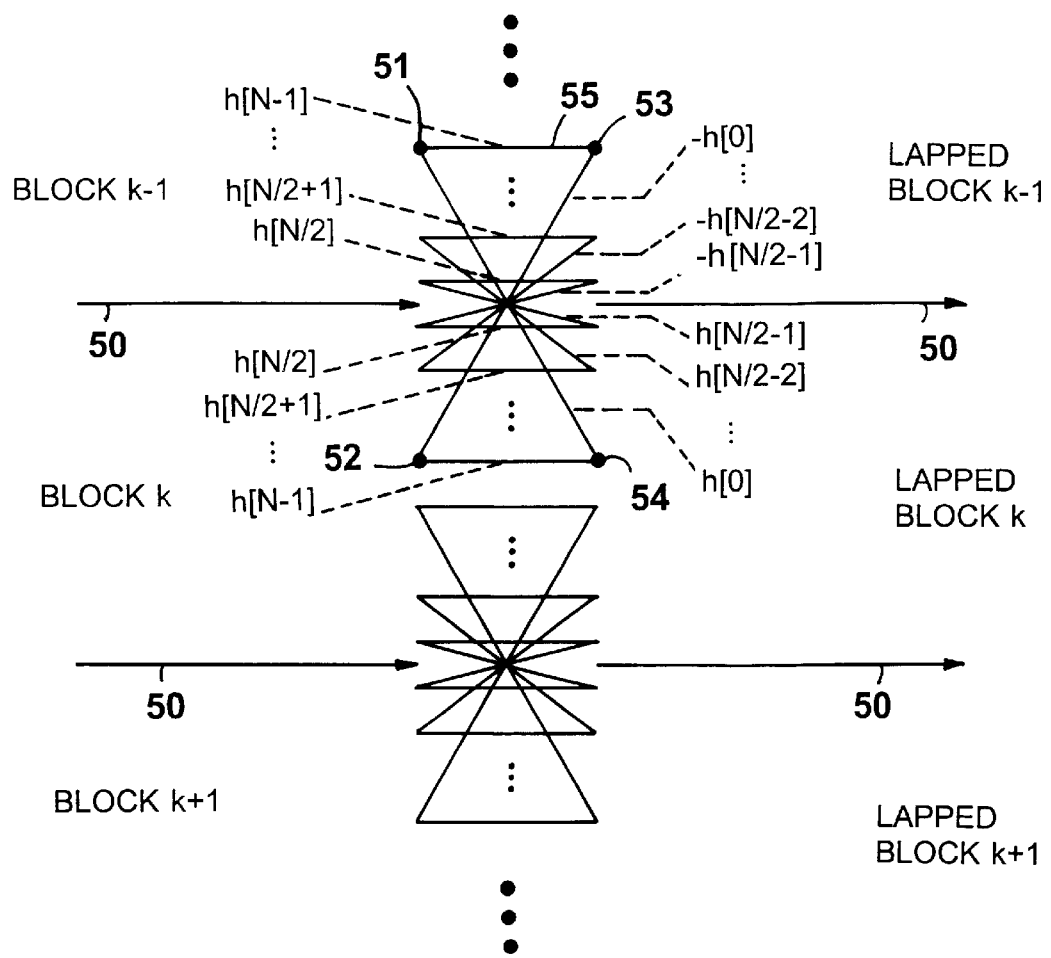
FIG. 2 is a butterfly diagram illustrating a LOVQ encoder window operator.

Referring to FIG. 2, implementation of an MLT window operator 30 with orthogonal butterflies is shown. The butterfly transmittances are given by $$h[n]=\sin[(2n+1)\pi/4N]$$

This choice for the window operator leads to the overlapping length-2N decoder codevectors tapering smoothly to zero at both ends and leads to a reconstruction that avoids blocking artifacts. This follows from the fact that each length-2N codevector generated at the output of the LOVQ decoder 28 (FIG. 1c) is a linear combination of the N smoothly tapered basis functions of the window operator, which are the columns of the window operator matrix.

The arrows 50 indicate both signal direction (from input to output) in the operator and the boundaries between blocks of N samples. Each of the butterflies (for example, butterfly 55 with inputs 51 and 52 and corresponding outputs 53 and 54) represents a non-symmetric but orthogonal matrix. For N=8, the matrix for butterfly 55 is $$\begin{bmatrix} h[7] & -h[0] \\ h[0] & h[7] \end{bmatrix}$$

which is applied to inputs 51 and 52 (taken as a column vector) to produce outputs 53 and 54 (again, as a column vector).

With the fast-computable MLT window, the LOVQ system complexity, in terms of both computation and memory requirements, is dominated by its VQ subsystem and thus is comparable to that for traditional VQ systems. This makes LOVQ an attractive alternative to lapped VQ schemes that reduce blocking artifacts by extending the reconstruction codevectors beyond the block boundaries at the decoder, which schemes require a decoder codebook whose vectors are of length 2N.

Referring again to FIG. 1c, the inverse window operator 42 to be used at the decoder 28 is simply the transposition of the butterfly signal flow graph shown in FIG. 2.

Optimization of Coding

It is desirable to optimize LOVQ systems to yield both minimal block artifacts and minimal overall coding distortion. To begin, one notes that when the original source x[n] is stationary, the sequence of overlapping length-2N vectors x at the input to the window operator 30 is a stationary vector source with Toeplitz covariance matrix $R_x$. In turn, the length-N vectors of transform coefficients y at the input to the vector quantizer 32 is also a stationary vector source with covariance matrix $R_y = W R_x W^T$.

For ergodic sources, the mean-square distortion-rate function for blocks of size N is bounded according to $$D_N(R) \leq \sigma_x^2 \gamma_N^2 2^{-2R},$$

where $\sigma_x^2$ is the variance of the source, and where $\gamma_N^2$ is the spectral flatness measure for the source, i.e., $$\gamma_N^2 = \frac{\left[\prod_{k=0}^{N-1} \lambda_k\right]^{1/N}}{\frac{1}{N}\sum_{k=0}^{N-1} \lambda_k} = \frac{N[\det R_y]^{1/N}}{tr R_y} = \frac{N[\det(W R_x W^T)]^{1/N}}{tr(W R_x W^T)} \quad (1)$$

with $\lambda_k$ denoting the kth eigenvalue of $R_y$, det denoting the determinant, and tr denoting the trace operator.

The rate-distortion bound suggests that optimum VQ performance is obtained when the spectral flatness measure $\gamma_N^2$ is minimized. Thus, the desired optimization is to minimize equation (1) over all possible window operators W subject to the constraint that the operators correspond to orthogonal transformations. This constraint can be expressed in the form $$W W^T = I, \text{ and } W \begin{bmatrix} 0 & I \\ 0 & 0 \end{bmatrix} W^T = 0 \quad (2)$$

where I is the identity matrix and 0 is the zero matrix, both of size N×N.

In addition, it is sometimes convenient to further constrain the window operator to have a fast implementation of the MLT form illustrated in FIG. 2. In this case, the orthogonality conditions (2) are equivalent to the condition that the window sequence h[n] satisfy $$h^2[n]+h^2[N-1-n]=1$$

for n=0, 1, . . . , N/2−1. See, e.g., H. S. Malvar, *Signal Processing With Lapped Transforms*, supra. The butterfly transmittances given by $h[n]=\sin[(2n+1)\pi/4N]$ satisfy this orthogonality condition.

For first-order autoregressive sources x[n], for which the autocorrelation function is $R_x[k]=\sigma^2 \rho^{|k|}$, the MLT window operator is asymptotically near-optimal, i.e., it is near-optimal as $\rho \to 1$ except for very small block sizes. For N=2, the optimal window sequence differs from that of the MLT, but can be readily computed, yielding $$h[0]=\sin(\pi/6) h[1]=\cos(\pi/6). \quad (3)$$

Performance Characteristics

Figure 3A:
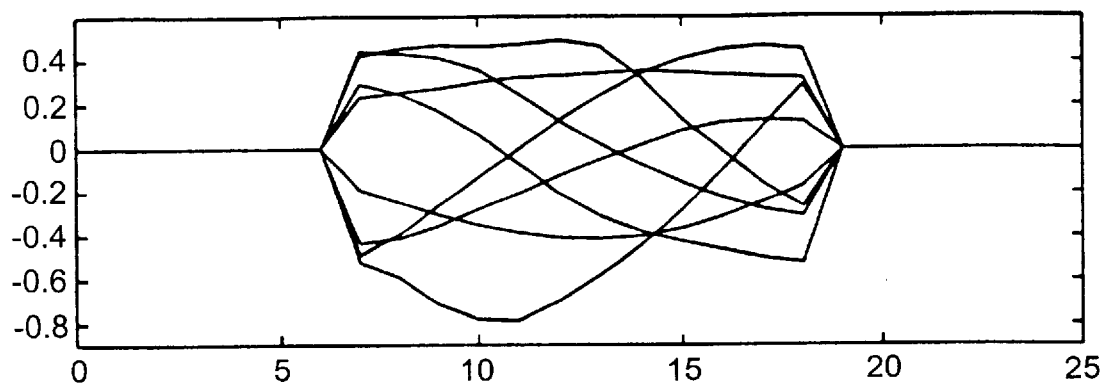
FIG. 3a and FIG. 3b are a pair of graphs comparing representative VQ codevectors for speech.
Figure 3B:
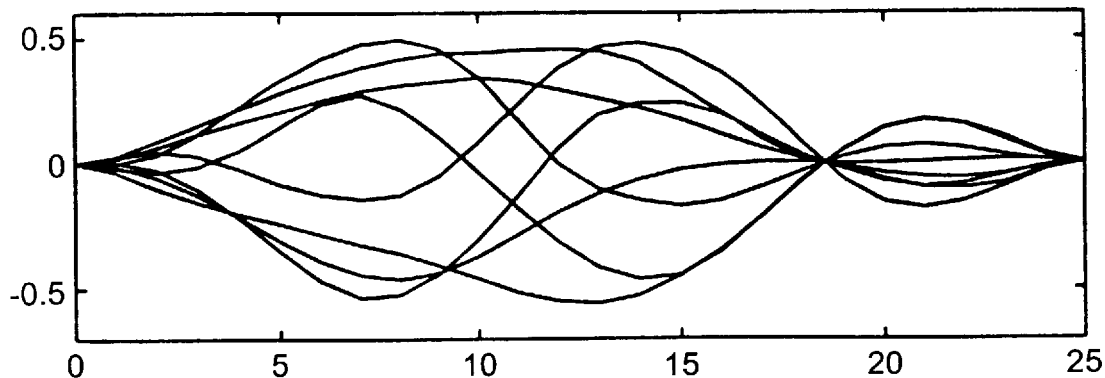

Experiments involving speech and image data were conducted to verify the anticipated reduction in blocking artifacts. With the speech data, LOVQ based on the MLT window was compared with traditional VQ at a rate R=0.5 bits/sample and a VQ block size of N=12. Representative codevectors from the respective codebooks are depicted in FIG. 3a and FIG. 3b. The abscissa in these figures is the sample index. The ordinate is the signal amplitude.

FIG. 3a shows VQ codevectors for speech representative of traditional VQ, as would be output, for example, from vector reconstructor 40 (FIG. 1c). Because N=12, each vector can have non-zero amplitude values (the ordinate) for only 12 samples, namely index values 7 through 18. FIG. 3b shows corresponding vectors as would be output by inverse window operator 42 (FIG. 1c) of MLT-based LOVQ. The smooth decay of the LOVQ vectors shown in FIG. 3b contributes to the reduction of blocking artifacts.

Figure 4:
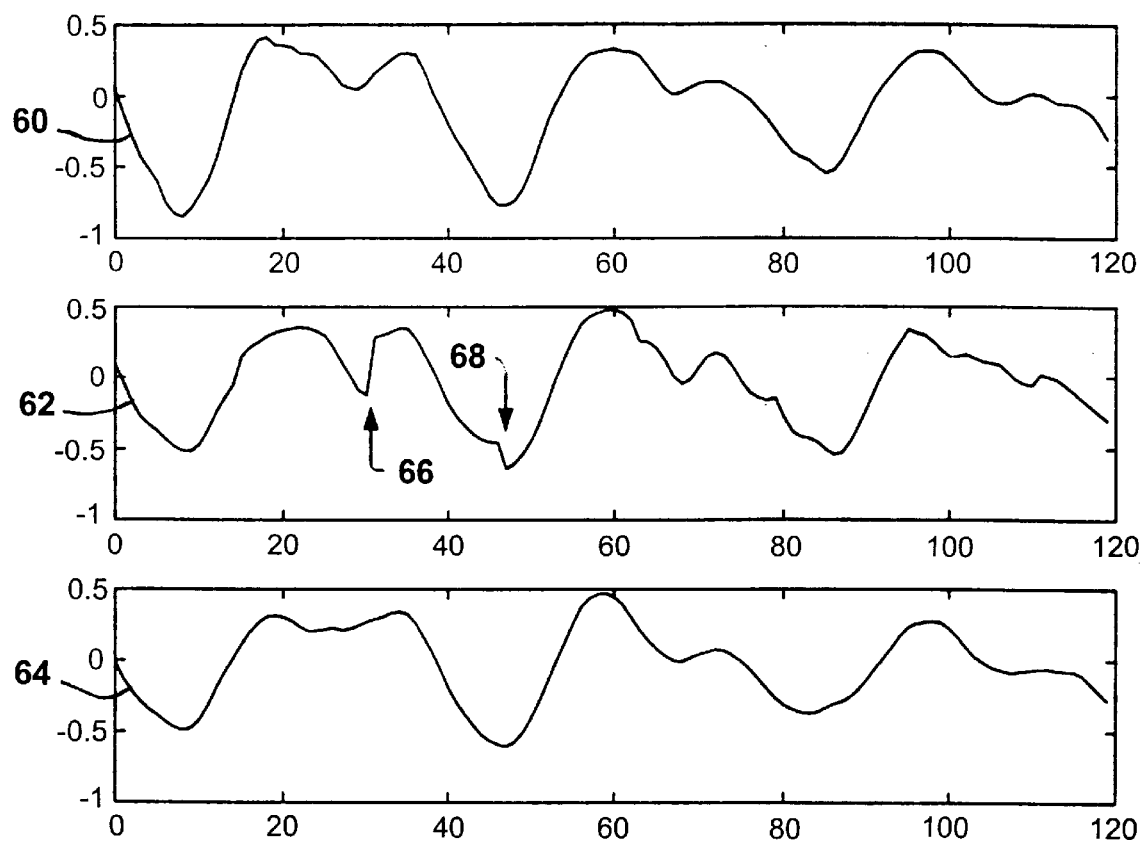
FIG. 4 shows a speech coding example and a comparison of reconstruction with traditional VQ to reconstruction with LOVQ.

FIG. 4 is a set of three graphs showing a speech coding example 60 and two reconstructions, one with traditional VQ and the other with LOVQ. As the illustrated waveform segments reflect, while traditional VQ (waveform 62) led to both visibly and audibly significant blocking artifacts, indicated by the arrows 66 and 68, these were effectively eliminated with LOVQ (waveform 64). In another experiment (not shown), a test image of size 128×128 pixels and 8 bits/pixel resolution was used to compare LOVQ based on the MLT-window to traditional VQ with 4×4 blocks (N=16) at rate R=0.5 bits/sample. With traditional VQ, the reconstruction had prominent blocking artifacts; while with the LOVQ reconstruction, the blocking effects are mitigated without loss of resolution.

Figure 5:
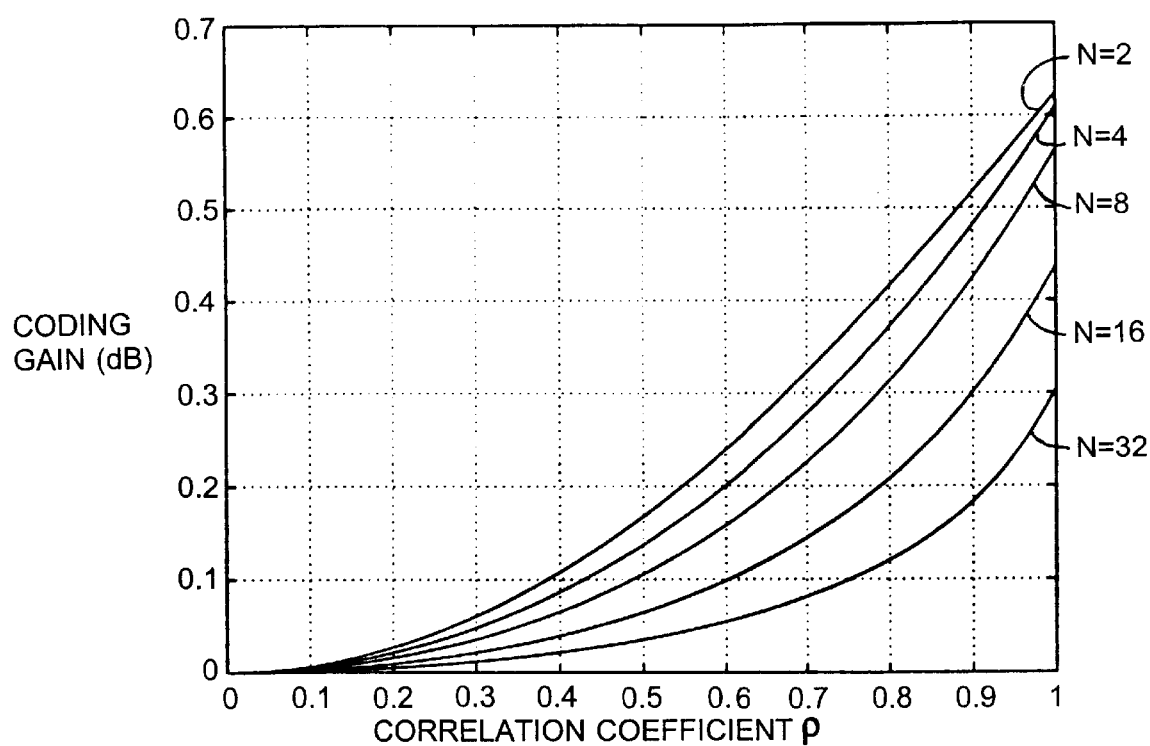
FIG. 5 illustrates achievable coding gain of LOVQ over traditional VQ for a first-order autoregressive source.

In the above examples, the reduction of blocking artifacts was accompanied by a modest reduction in overall mean-square distortion as well, as predicted in the theory set forth above in connection with equation (1). FIG. 5 depicts the coding gain that can be achieved for first-order autoregressive sources using LOVQ with a fast window operator over traditional VQ with the same VQ block size N, as measured by the rate-distortion bound. For the case N=2, the window operator that was used corresponded to the window sequence of equation (3) above; for N>2, the MLT window operator was used. The successively lower curves correspond to VQ block sizes N=2, 4, 8, 16, and 32. The figure shows that greater coding gains are achieved for more strongly correlated sources and smaller block sizes.

Conclusion

LOVQ is an efficient lapped VQ strategy that leads to reduced blocking artifacts when compared with traditional VQ systems. This reduction is accompanied by a reduction in overall mean-square distortion. These performance enhancements are achieved with little increase in system complexity or memory requirements. In particular, the increase in complexity amounts to a total of only 1.5 additional multiplies and adds per input sample.

The present invention has been described in terms of specific embodiments. The invention, however, is not limited to these specific embodiments. Rather, the scope of the invention is defined by the following claims, and other embodiments are within the scope of the claims.

For example, the lapped transform basis functions from adjacent blocks may overlap on each side by more or less than 50% on each side, so that their length may be more or less than twice the block size but always greater than the block size itself. Also, the specific window coefficient values set forth in this description, which resulted from the specific optimization and orthogonality goals discussed above, represent a specific embodiment; in other contexts different window coefficient values can be used, including values that lead to nonorthogonal butterflies, which can be advantageous in many applications. In particular, the coefficient values of the reconstructor window operator may be chosen to differ from those of an exact inverse of the encoder lapping window operator for the purposes, for example, of providing filtering to compensate for distortion in the communications channel.

What is claimed is:

1. A method for encoding a sampled signal, consisting essentially of:

applying a lapping window operator to blocks of signal samples of length greater than N to produce length-N transform vectors; and applying a nonscalar vector quantizer to encode the length-N transform vectors, whereby the encoded signal is produced.

2. The method of claim 1 where the window operator is identical to that of a modulated lapped transform.

3. The method of claim 1 where the window operator is a 2N×N matrix operator.

4. The method of claim 1 where the window operator is a 2N×N modulated lapped transform window operator with asymmetrical, orthogonal butterflies.

5. The method of claim 1 where the vector quantizer is an unconstrained mean-square optimized vector quantizer having codewords of length N.

6. The method of claim 1 where:

the window operator is a modulated lapped transform window operator with asymmetrical, orthogonal butterflies; and butterfly transmittances of the window operator are given by $h(n)=\sin((2n+1)\pi/4N)$.

7. The method of claim 1 where:

the window operator is a 2N×N matrix operator identical to that of a modulated lapped transform with asymmetrical, orthogonal butterflies;

butterfly transmittances of the window operator are given by $h(n)=\sin((2n+1)\pi/4N)$; and the vector quantizer is an unconstrained mean-square optimized vector quantizer having codewords of length N.

8. A system for transmitting a sampled signal over a transmission channel, comprising:

a block encoder to receive the sampled signal and apply a lapping window operator to transform overlapping length-M vectors of signal samples into non-overlapping length-N vectors, where M is greater than N;

a nonscalar vector quantizer connected to receive as input the length-N vectors from the block-encoder;

a vector reconstructor being an inverse of the nonscalar vector quantizer to reconstruct length-N vectors coupled through the transmission channel to receive the length-N vectors from the vector quantizer;

a block decoder connected to receive as input the reconstructed length-N vectors from the vector reconstructor and apply a reconstructor window operator to produce length-M vectors; whereby length-M vectors are produced that are superimposed to generate a reconstruction of the sampled signal;

the block encoder applies a 2N×N window operator identical to that of a modulated lapped transform; and the vector quantizer is an unconstrained mean-square optimized vector quantizer having codewords of length N.

9. The system of claim 8 where:

the reconstructor window operator is the inverse of the lapping window operator.

10. A method for encoding and reconstructing a signal, consisting essentially of the steps of:

applying a lapping window operator to blocks of signal samples of length greater than N to produce length-N transform vectors;

applying a nonscalar vector quantizer to encode the length-N transform vectors, whereby an encoded signal is produced;

applying a vector reconstructor being an inverse of the nonscalar vector quantizer, to reconstruct length-N vectors from the encoded signal; and applying a lapping window inverse operator to produce length-M vectors from the length-N vectors, with M greater than N;

whereby the length-M vectors so produced can be superimposed to generate a reconstructed sampled signal.

* * * * *